Patented Dec. 15, 1942

2,305,007

UNITED STATES PATENT OFFICE 2,305,007

PRODUCTION OF POLYMERIZATION PRODUCTS

Heinrich Hopff and Curt W. Rautenstrauch, Ludwigshafen-on-the-Rhine, Germany, assignors to Jasco Incorporated, a corporation of Louisiana No Drawing. Application December 19, 1939, Serial No. 309,958. In Germany December 3, 1938

7 Claims. (Cl. 260—93)

The present invention relates to a process of producing polymerization products.

It is well known to prepare interpolymerization products from olefines, especially isobutylene, and butadiene. In order to obtain interpolymerization products of as high a molecular weight as possible the process must be carried out at low temperatures in the presence of organic diluents of low boiling point, such as propane, ethylene, or methane, and in the presence of acid-reacting condensing agents, especially boron fluoride or aluminium chloride. While the emulsion polymerization of mixtures of olefines and butadienes would offer the advantage of greater ease in operation and in the working up of the polymerization products, it has failed, nevertheless, in practice up to now.

We have now made the surprising discovery that valuable homogeneous interpolymerization products from butadienes and olefines having at least 3 carbon atoms in the molecule, for example propylene, α-butylene, β-butylene and in particular isobutylene can be prepared by emulsion polymerization when the proportions of butadiene in the mixture to be polymerized are kept at above 50 per cent by weight.

The polymerization is carried out in the manner usual in the emulsion-polymerization; i. e. by bringing the monomeric substances into a state of fine dispersion in an aqueous solution of an emulsifying agent by shaking or agitating both components in the desired ratio until a fine milk is obtained, incorporating the polymerization mixture with substances promoting and, if desired, with substances regulating the polymerization, for example aldehydes or substances splitting off aldehydes, and heating the emulsion at a moderate temperature, say at from 40 to 80° C.

Among suitable butadienes we may mention butadiene itself, isoprene, dimethylbutadiene and beta-chlorbutadiene. Suitable emulsifying agents are all those substances which contain a lipophilic and a hydrophilic group and lessen the surface tension of water, i. e. substances having a soap-like character, as alkylated naphthalene sulphonic acids, fatty alcohol sulphonates, taurides of higher fatty acids, sulphonated fatty acid amides, the addition products of several molecules of ethylene oxide to fatty acid alcohols or fatty acid amines and the reaction products from fatty acid amines and aliphatic dichloro compounds.

Suitable polymerization catalysts are substances setting free oxygen, as hydrogen peroxide, persulphates, percarbonates, perborates, benzoylperoxide, peracetic acid or diacetylperoxide. Slight additions of acetylene alcohols, as butindiol, propargyl alcohol etc. in some cases bring about a marked acceleration of the polymerization. The latter may be carried out continuously or discontinuously, with or without the application of pressure.

The following examples serve to illustrate how the present invention may be carried out in practice but the invention is not restricted to these examples. The parts are by weight.

Example 1

4000 parts of butadiene and 2000 parts of isobutylene are emulsified in 8000 parts of a 4 per cent aqueous solution of the condensation product from 1 molecular proportion of beta-beta'-dichlorodiethylether and 2 molecular proportions of an amine mixture obtained from fatty acids from the paraffin oxidation by way of the nitriles. After adding 5 parts of ammonium persulphate and 40 parts of hydrogen peroxide of 30 per cent strength the emulsion is stirred at 40° C. for 100 hours. From the resulting dispersion the polymerization product is precipitated by the addition of methanol or ammonia in the form of a crumbly mass. The latter is sucked off, washed on rollers and dried at a gentle temperature. The interpolymerization product obtained is rolled out into smooth elastic sheets which may be worked up with fillers, sulphur and vulcanization accelerators and transformed into high-quality vulcanizates.

By using 6000 parts, instead of 4000 parts, of butadiene similar products are obtained. Instead of butadiene an equal quantity of isoprene or beta-chlor-butadiene may be used.

Example 2

375 parts of butadiene and 125 parts of alpha-butylene are emulsified in 1000 parts of a 3 per cent aqueous solution of the sodium salt of alpha-hydroxyoctodecane sulphonic acid and polymerized, after the addition of 3 parts of potassium persulphate and 15 parts of 30 per cent hydrogen peroxide in a pressure-tight vessel at 45° C. while stirring well. From the resulting dispersion the polymerizate is precipitated as a crumbly mass by the addition of methanol or a solution of aluminium sulphate. The said mass is washed and dried and rolled to an elastic sheet which by incorporation of fillers, sulphur and vulcanization accelerators may be worked up into high-quality vulcanizates.

Example 3

40 parts of butadiene and 10 parts of alpha-butylene are emulsified in 100 parts of a 4 per cent solution of the condensation product from 1 molecular proportion of β.β'-dichlor-diethylether and 2 molecular proportions of an amine mixture obtained from fatty acids of the paraffin oxidation by way of the nitriles and polymerized at 45° C. while stirring well, 0.08 part of potassium persulphate and 0.6 part of 30 per cent of hydrogen peroxide having been added. The polymerization dispersion is coagulated by means of ammonia or methanol and the crumbly coagulate thus obtained is washed, dried and rolled. It yields excellent elastic vulcanizable masses.

When employing in the processes described in Examples 2 and 3, β-butylene instead of α-butylene, elastic sheets are likewise obtained which may be worked up into high-quality vulcanizates.

Example 4

500 parts of butadiene and 400 parts of propylene are emulsified in 1500 parts of a 3 per cent aqueous solution of the sodium salt of alpha-hydroxyoctodecane sulphonic acid and polymerized in a pressure-tight vessel for 1 to 2 days at from 50° to 60° C. after adding 30 parts of 30 per cent hydrogen peroxide and 10 parts of potassium persulphate. The polymerizate is precipitated from the resulting dispersion by means of an aluminium sulphate solution as a crumbly mass, which, after having been washed, dried and rolled out into elastic sheets, may be worked up into vulcanizates in the usual way.

What we claim is:

1. In the production of interpolymerization products of a conjugated butadiene and isobutylene, the step which comprises subjecting to polymerization an aqueous emulsion of a mixture of isobutylene and a preponderating amount of butadiene in the presence of a polymerization catalyst capable of setting free oxygen in said emulsion.

2. In the production of interpolymerization products of a conjugated butadiene and alpha-butylene, the step which comprises subjecting to polymerization an aqueous emulsion of a mixture of alpha-butylene and a preponderating amount of butadiene in the presence of a polymerization catalyst capable of setting free oxygen in said emulsion.

3. In the production of interpolymerization products of a conjugated butadiene and a propylene, the step which comprises subjecting to polymerization an aqueous emulsion of a mixture of propylene and a preponderating amount of butadiene in the presence of a polymerization catalyst capable of setting free oxygen in said emulsion.

4. In the production of interpolymerization products of a conjugated butadiene and aliphatic monoolefines, the step which comprises subjecting an aqueous emulsion of a mixture of a lower aliphatic monoolefine containing at least three carbon atoms in the molecule and a preponderating amount of a conjugated butadiene to polymerization in the presence of a polymerization catalyst capable of setting free oxygen in said emulsion.

5. The process as defined in claim 4 wherein the butadiene is butadiene-1.3.

6. In the production of interpolymerization products of a conjugated butadiene and aliphatic monoolefines, the step which comprises subjecting an aqueous emulsion of a mixture of an aliphatic monoolefine containing from three to four carbon atoms in the molecule and a preponderating amount of a conjugated butadiene to polymerization in the presence of a polymerization catalyst capable of setting free oxygen in said emulsion.

7. The process as defined in claim 6 wherein the butadiene is butadiene-1.3.

HEINRICH HOPFF.
CURT W. RAUTENSTRAUCH.